United States Patent
Azose et al.

(10) Patent No.: US 12,430,498 B2
(45) Date of Patent: Sep. 30, 2025

(54) DRAFTING ASSISTANT FOR A BROWSER

(71) Applicant: GOOGLE LLC, Mountain View, CA (US)

(72) Inventors: Benjamin Albert Azose, San Carlos, CA (US); Max Benjamin Christoff, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 168 days.

(21) Appl. No.: 18/480,969

(22) Filed: Oct. 4, 2023

(65) Prior Publication Data

US 2025/0117573 A1    Apr. 10, 2025

(51) Int. Cl.
*G06F 40/166* (2020.01)

(52) U.S. Cl.
CPC .................... *G06F 40/166* (2020.01)

(58) Field of Classification Search
CPC .............. G06F 40/166; G06N 20/00
See application file for complete search history.

(56) References Cited

U.S. PATENT DOCUMENTS

| | | | | |
|---|---|---|---|---|
| 11,983,488 B1 * | 5/2024 | Puri | ........................ | G06F 40/30 |
| 12,010,076 B1 * | 6/2024 | Andrew | ................... | H04L 51/02 |
| 2024/0311652 A1 * | 9/2024 | Kulkarni | ................ | G06N 3/045 |
| 2024/0378396 A1 * | 11/2024 | Bhupati | ................... | G06F 40/20 |
| 2024/0378399 A1 * | 11/2024 | Gandhi | ................... | G06F 16/345 |
| 2024/0403289 A1 * | 12/2024 | Hawes | ................... | G06F 16/2455 |
| 2024/0419465 A1 * | 12/2024 | Riscutia | ................... | G06F 40/166 |
| 2025/0117605 A1 * | 4/2025 | De Wynter | ............. | G06F 40/30 |
| 2025/0139381 A1 * | 5/2025 | Lu | ......................... | G06F 3/0482 |
| 2025/0139387 A1 * | 5/2025 | Jang | ..................... | G06F 40/284 |

OTHER PUBLICATIONS

International Search Report and Written Opinion for PCT Application No. PCT/US2024/049449, mailed Jan. 9, 2025, 14 pages.
Belgacem, et al., "A Machine Learning Approach for Automated Filling of Categorical Fields in Data Entry Forms", ACM Transactions on Software Engineering and Methodology, vol. 32, No. 2, Article 47, Mar. 2023, 40 pages.
Bucur, "Exploring Large Language Models and Retrieval Augmented Generation for Automated Form Filling", TScIT 37, Enschede, The Netherlands, Jul. 7, 2023, 6 pages.

* cited by examiner

*Primary Examiner* — Asher D Kells
(74) *Attorney, Agent, or Firm* — Brake Hughes Bellermann LLP (57) ABSTRACT

Implementations relate to a drafting assistant that assists users in generating prompts for a language model that generates responses for text boxes for a web page. Implementations may receive a prompt from a user regarding an input for the text box, generate a modified prompt by incorporating contextual information identified from the web page, and provide the modified prompt to a generative language model, which generates a response for the modified prompt. The response is presented to the user and can be used as the input for the text box. Implementations dynamically engineer/enhance prompts based on the context of the web page, thereby facilitating more accurate and relevant responses from the generative language model.

25 Claims, 7 Drawing Sheets

DRAFTING ASSISTANT FOR A BROWSER

BACKGROUND

Web sites provide information or functionality helpful to users and many users use the Internet to research products, places, companies, services, and to provide feedback on these items, post to social media or news feeds, etc. Thus, many web pages include user interface elements configured to obtain text input from a user. Examples include web pages that enable users to leave reviews about a product, a service, a place, etc., web pages that enable users to leave comments or replies to comments, web pages that enable users to post messages (e.g., web pages for social media web sites), web pages that include a survey, etc.

SUMMARY

Implementations relate to a drafting assistant tool that uses generative AI to help users generate input for a text box on a web page. For example, the drafting assistant may assist a user in leaving a review, commenting on an article, providing a survey response, drafting a social media post, etc. The drafting assistant may receive a prompt from the user relating to a general idea of what to include in a generated response. The assistant may modify the prompt before submitting the prompt to a generative language model. The modifications to the prompt are instructions that provide guidance to the generative language model in generating the response so that the response is of higher quality or more relevant. The instructions may be based on context from the web page itself. The modifications to the prompt (the instructions) may be hidden from the user, or in other words, may be added without being shown to the user. The modifications to the prompt (the instructions) may be presented to the user. In some implementations, the drafting assistant may provide an opportunity for the user to edit the instructions before submission of the modified prompt to the generative language model.

The details of one or more implementations are set forth in the accompanying drawings and the description below. Other features will be apparent from the description and drawings.

DETAILED DESCRIPTION

This disclosure is related to a drafting assistant tool for a browser that provides assistance in drafting input for a text box on a web site. The drafting assistant tool can be triggered (surfaced, invoked) in association with a text box on a web page. A text box is a user interface element in which the user can provide textual input. The textual input can be provided via a keyboard, touch screen, voice (e.g., voice to text), etc. The textual input can include numbers, letters, characters, emoji, etc. The drafting assistant tool helps the user generate text for the text box, but uses context identified from the web page to guide the response generation. In particular, the drafting assistant tool can generate a modified prompt from the user's prompt, adding instructions that help the large language model generate a response with increased relevance for the text box.

A technical solution provided by the drafting assistant tool provides a novel interface that supports a continued and/or guided human-machine interaction process for providing responses (input) to textual user interface elements. In particular, the tool adds context to a user's prompt for a generative language model to increase the relevance and quality of the returned response. Put another way, the drafting assistant uses intelligent understanding of a web page and the text box to help a user generate new content for the text box. The content of a web page is maintained (e.g., persists) in the browser while the drafting assistant tool interfaces are displayed. At least one technical effect of the tool is integration of a generative language model with a browser, which reduces the number of interactions a user has with a computing device to utilize a large language model. Additionally, the drafting assistant tool modifies the prompt using intelligence, based on web page context, to increase the quality and relevance of a generated response. Put another way, the responses generated with the drafting tool are more likely not to need editing and are more likely to be appropriate for and relevant to the web page, thus decreasing user interactions with the computing device and use of computing resources in generating the response.

In some implementations, another technical effect can be to ensure security. For example, some implementations may calculate a trustworthiness score for a web page and may use the trustworthiness score to provide protections for the user. The protections may include instructions designed to protect the user from providing sensitive details in the text input box. Put another way, if a trustworthiness score of the web page satisfies an untrustworthiness threshold, some implementations may generate an instruction to be included in the modified prompt that signals to the large language model that certain information (e.g., personal information) about the user should not be included in the generated response (such as address, identifiers, birthdates, etc.) even if this information is in the user-provided prompt. As another example, some implementations may add an instruction to signal to the model that the response should be generated for an untrustworthy site (e.g., a phishing site). Some implementations may not provide a modified prompt for text input boxes on some web pages based on the trustworthiness score. Put another way, some implementations may not trigger the tool on web pages with a trustworthiness score that fails to satisfy a trustworthiness threshold.

The modifications can include instructions related to context for the current web page. The context can be extracted from the web page or the web site (domain) of the web page. Thus, context can include visible content of the web page, metadata (non-visible content) of the web page, including metadata that describes attributes of the text box, etc. The context can include attributes or content for the domain to which the web page belongs. For example, in some implementations, the drafting tool may use an index, e.g., generated by a search engine, to identify content for the domain that can be used to generate an instruction. The instructions can include things like limiting the response to x characters (based on attributes of or text describing the text box discovered from the HTML); drafting the response in the style of x, where x may be the type of text box (e.g., a comment, a review, a social media post, etc.) and/or the domain of the web page (e.g., in the style of a classified advertisement, in the style of a newspaper comment); avoiding the use of y terms (e.g., where boilerplate or small print on the web page or in a page associated with the domain indicates y should not be used), etc. Implementations can also help users avoid entering information in untrustworthy web sites, e.g., by adding "please write answer in the style of a person responding on an untrustworthy site," "exclude personal information from your response," or "do not include account information in your response", if the browser determines the web site is questionable (e.g., via a trustworthiness determination performed by the browser). This may be done where the user has an opportunity to edit the modifications.

In some implementations, the browser drafting assistant can be integrated as part of the browser, e.g., in a side panel of the browser or as a floating window of the browser. This ensures that the browser drafting assistant may not be spoofed (e.g., imitated) by a third party or the owner of the web page content. This can be implemented as a security feature so that a user can distinguish legitimate drafting assistant content provided by the drafting assistant tool from other content, that can be inserted by a third party or by the provider of a web page or other resource. Accordingly, the technical problem of spoofing content can be obviated by the technical solution of integrating a contextual search area within the browser. The technical effect of integration of a contextual search area within a browser is that spoofing can be prevented.

The implementations described herein enable improved guided human-machine interactions for obtaining multi-line input for web pages. The drafting assistant uses contextual information from the web page to help the large language model better understand the context in which the multi-line text input appears and, therefore, to generate a response of higher quality and more relevance using a single user interface, i.e., an interface integrated into the browser. This results in fewer user interactions with the computing device to complete the task, e.g., because a user does not need to switch interfaces to use a generative language model to help generate text for the text box and because likelihood of revisions (rounds with the generative language model) may be reduced due to increased quality of the response, based on the modifications related to web page context.

The browsers described herein can be executed within a computing device. For example, the browsers can be executed within a laptop device. In some implementations, the browsers can be executed within a mobile device or on any other device with limited available screen space. Although many of the implementations shown and described herein are shown in landscape mode, any of the implementations described herein can be rendered in portrait mode. Likewise, implementations described herein in portrait mode can be rendered in landscape mode.

The drafting assistant tool includes a novel user interface and new browser functionalities. The novel user interface helps users compose answers for multi-line text boxes and integrates the connection with a generative language model into the application, so that a separate window is not needed and user actions are minimized. In particular, the drafting assistant tool includes intelligence that extracts context from a resource (e.g., a web page and/or web site) and uses that context in combination with a prompt from the user to obtain text for a multi-line text box without navigating away from the original web page. The drafting assistant tool may generate additional instructions for the prompt based on the context and these additional instructions can be added to the prompt, e.g., generating a modified prompt, before a request is sent to the generative language model. The generative language model may be a general generative language model, e.g., a generative language model configured (trained) to respond to user prompts about any topic. Thus, implementations can use an existing model but generate instructions (a modified prompt) that help the existing model to better formulate a response for the text box. Put another way, implementations generate engineered prompts that can be better tailored to the model and that can cause the generative language model to increase the relevancy of the generated responses and decrease rounds of editing. The generative language model can be located on the user's device. The generative language model can be accessible to the user's device, e.g., via a network. The drafting tool enables a user to obtain a response for the text box with fewer resources (fewer provided inputs and less navigation). The drafting assistant tool can be surfaced in multiple ways and can be presented with varying levels of detail.

Figure 1:
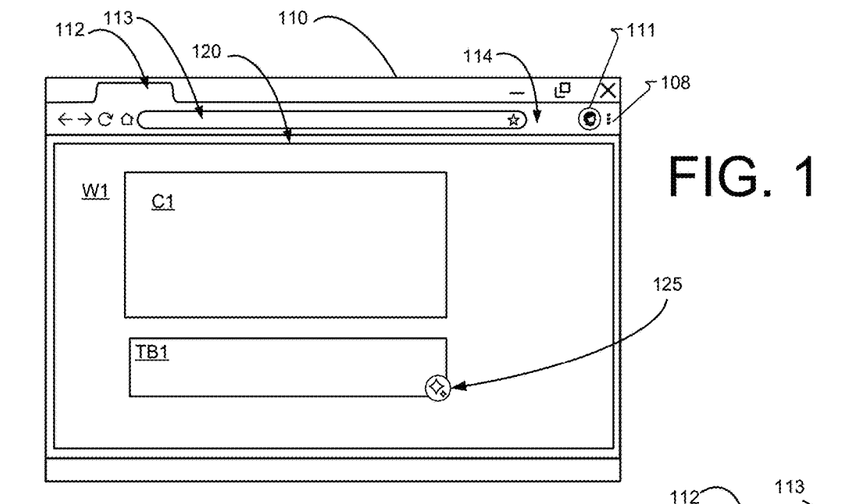
FIG. 1 illustrates an example browser interface illustrating initiation of a drafting assistant tool, according to an implementation.

FIG. 1 illustrates an example browser interface illustrating initiation of a drafting assistant tool, according to an implementation. FIG. 1 is a diagram that illustrates a browser 110 displaying a resource W1 within a display area 120 of the browser 110. In some implementations, the display area 120 can be within a tab 112 of the browser 110. The browser 110 includes an address bar area 114. An address of the web page W1 can be illustrated in the address bar area 114 (e.g., input address area 113). The address bar area may include a user icon 111 representing a profile of a user associated with the browser window if the browser window is associated with the user profile. The address bar area 114 includes app menu control 108. App menu control 108 may be a selectable control that brings up a menu of options, such as settings options or other functionality, provided by the browser 110. Other controls, icons, and/or so forth can be included in the address bar area 114. The address bar area 114 can be controlled by and/or associated with the browser 110 (e.g., the browser application). Because the address bar area 114 is controlled by the browser 110, the web page W1 and/or a provider of the web page W1 does not have access to content displayed in the address bar area 114 or triggering actions provided by actionable elements of the address bar area 114.

The webpage W1 of FIG. 1 includes visible text content C1, e.g., such as text or images, etc. The webpage W1 also includes a multi-line text box TB1. The text box TB1 is any text box that receives text from a user, e.g., via typing, gestures-to-text, voice-to-text, etc. In some implementations, a multi-line text box such as TB1 may exclude text boxes that expect or enforce a certain format, such as formats for email addresses, phone numbers, dates, etc. In the example of FIG. 1, the user has given the text box TB1 focus. In response to giving the text box TB1 focus, the browser surfaces (causes to be visible, displays) tool affordance 125. The tool affordance 125 may be a selectable control configured to open the drafting assistant tool. In some implementations the tool affordance 125 may be a selectable icon. In some implementations, the tool affordance 125 may be a menu option. For example, in some implementations, the user may right-click in the text box TB1 to bring up a menu. The tool affordance 125 may be a menu option in the right-click menu. Moreover, although illustrated as in/near the multi-line text box TB1, the tool affordance 125 can be located in other areas, such as in the address bar area 114 or in the input address area 113. In some implementations, the tool affordance 125 may be surfaced in response to determining that the text box TB1 meets other criteria in addition to receiving focus, for example that the text box TB1 accepts at least a minimum number of characters, emoji, numbers, etc.

Figure 2A:
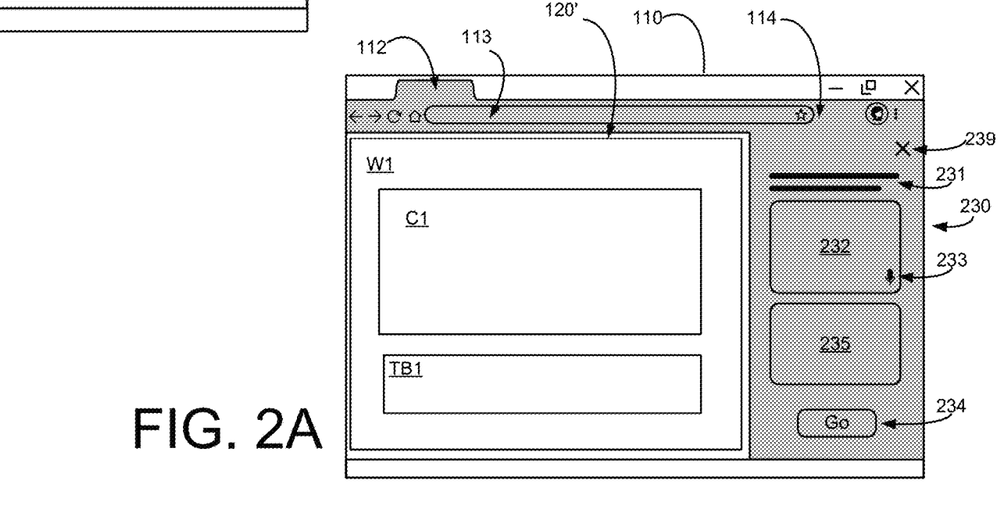
FIG. 2A illustrates an example drafting assistant interface, according to an implementation.

FIG. 2A illustrates an example drafting assistant user interface 230, according to an implementation. In some implementations, the browser 110 may be configured to display drafting assistant user interface 230 in response to selection of the tool affordance 125. In the example of FIG. 2A, the drafting assistant user interface 230 may be within a side-panel area controlled by the browser 110. However, in some implementations, the drafting assistant user interface 230 can be displayed in a pop-up window, a floating window, an overlay window, etc. In the example of FIG. 2A, the address bar area 114 of the browser 110 and the drafting assistant user interface 230 may be part of a contiguous area. Put another way, the browser can render the drafting assistant user interface 230 as part of the browser-controlled address bar area 114. This contiguous area (e.g., combined address bar area 114 and drafting assistant user interface 230) can be referred to as a browser action area. The browser action area is illustrated in FIG. 2A by the gray color that is contiguous between the address bar area 114 and the drafting assistant user interface 230. The drafting assistant user interface 230 can be integrated as part of the browser 110 (e.g., browser action area so that the drafting assistant user interface 230 may not be spoofed (e.g., imitated) by, for example, a third party or the owner of the content of the web page W1 content. Because the drafting assistant user interface 230 is part of the application of the browser 110, the integration of the drafting assistant user interface 230 would be difficult to imitate. Because the drafting assistant user interface 230 and the address bar area 114 are contiguous, any background or theme applied to the address bar area 114 would flow into (and would be contiguous with) the drafting assistant user interface 230 (as illustrated by the gray area). The contiguous background would be difficult for a third party (e.g., provider of the web page W1) to imitate within an application of the browser 110.

Although not shown in FIG. 2A, in some implementations, the drafting assistant user interface 230 is separated from the address bar area 114 by a visible separation line between the address bar area and the drafting assistant user interface 230. The line can be eliminated (e.g., omitted), for security purposes. When provided, this is a line that a third party (e.g., provider of the web page W1) may not remove (e.g., paint over, scrub out). In other words, when provided, this is a line that is controlled (e.g., provided by, eliminated by) the browser 110 (e.g., browser application), similar to the address bar area 114. The combining of the drafting assistant user interface 230 and the address bar area 114 can be an indicator of the authenticity of the content in the drafting assistant user interface 230. When the drafting assistant user interface 230 and the address bar area 114 are combined, it signifies that the browser 110 (or provider of the browser 110) is providing the tool affordance 125 and the drafting assistant user interface 230. In some implementations, when a separating line is present between the drafting assistant user interface 230 and the address bar area 114, information in the drafting assistant user interface 230 may be provided by an untrusted provider (e.g., a third party).

In some implementations, the drafting assistant user interface 230 can be triggered in response to selection of a menu option, e.g., from a menu displayed in response to selection of app menu control 108. In some implementations, the drafting assistant user interface 230 can be triggered in response to a text box, such as TB1, receiving focus. Having focus means that a user interface element is active, i.e., ready to receive input. In the example of FIG. 2A, the user may have initiated the drafting assistant via selection of the tool affordance 125 in FIG. 1 or via selection of a menu option (not shown) displayed in response to selection of the app menu control 108. In response to initiating the drafting assistant, in FIG. 2A the web page W1 is displayed within the display area 120' and the drafting assistant user interface 230 is also rendered within the browser 110. Accordingly, both the web page W1 and text box TB1 are displayed within the display area 120' and the drafting assistant tool interface is rendered in the drafting assistant user interface 230 within the browser 110. Display area 120' differs from display area 120 of FIG. 1 in size. In other words, display area 120' occupies less area on the display than display area 120 to make room for drafting assistant user interface 230 but is otherwise the same as display area 120.

As shown in FIG. 2A, in some implementations, the drafting assistant user interface 230 can include a prompt element 232. The prompt element 232 may be a text input box where the user can provide a prompt for generating the response for text box TB1. The prompt input area may enable a user to provide details to be included in the generated response for the input box and/or details to help guide the generated response. The details provided by the user are referred to as the prompt. In some implementations, the drafting assistant user interface 230 may include guidance text 231, which may help a user draft the prompt. In some implementations, the guidance text 231 may be shown in the prompt element 232. In some implementations, the drafting assistant user interface 230 may lack (not include) the guidance text 231. The drafting assistant user interface 230 may include voice input control 233. The voice input control 233 may record a user speaking and translate what was recorded to text, which appears in the prompt element 232. In some implementations, the drafting assistant tool interface may include a close control 239. The close control 239 may be a selectable control configured to, in response to being selected, cause the browser 110 to remove (e.g., clear) the drafting assistant user interface 230. In some implementations, removal of (e.g., clearing) the drafting assistant user interface 230 automatically returns the display area 120' to display area 120.

In some implementations, the drafting assistant user interface 230 may include prompt modification element 235. The prompt modification element 235 may display additional instructions to be added to the prompt entered in the prompt element 232 before a request is sent to the generative language model. In some implementations, the context is identified by analyzing the document object model (DOM)

for text or metadata relevant to the text box TB1. In some implementations, the context is identified by analyzing an accessibility tree for text or metadata relevant to the text box TB1. In some implementations, the context is identified by analyzing the DOM and the accessibility tree for the text or metadata relevant to the text box TB1. For example, the drafting assistant may inspect the nodes (in the DOM, the accessibility tree, or both) related to the text box TB1 for attributes describing the text box, such as a character size limit, text describing the purpose of the text box TB1, etc. The context can include text and/or images represented in the web page content. The content extractor can be configured to exclude certain types of information from the contextual content. For example, excluded content may include user information, sensitive information, third-party information, e.g., content supplied from a domain that does not match a domain of the web page, such as content for ads, etc. In other words, content of the webpage W1 that is fetched from a source not associated with the domain of the webpage W1 may be excluded. In some implementations, the content extractor can be a machine-learned extraction model. For example, the machine-learned model can be trained to exclude the user information, sensitive information, third-party information, etc. In some implementations, a machine-learned model may be used to identify the context and to generate the additional instructions. For example, a DOM and/or an accessibility tree may be provided to the model and the model may determine the context and/or the instructions generated based on the context. The model may be a model that runs on the user device. The additional instructions are generated by the drafting assistant tool, as explained in more detail with respect to FIG. 5. The additional instructions are based on context for the web page W1, including context for the text box TB1, as described herein.

The prompt modification element 235 may not be visible to the user in some implementations. If visible to the user, in some implementations, the prompt modification element 235 may be editable by the user. In such implementations, the user can edit text entered in the prompt element 232 and the prompt modification element 235. The drafting assistant user interface 230 may include a submit control 234. The submit control 234 may be a selectable control configured to, in response to being selected, cause the drafting assistant to modify the prompt (e.g., the text entered into the prompt element 232) with the instructions (e.g., the instructions from the prompt modification element 235) and send the modified prompt to a generative language model. Put another way, selection of the submit control 234 provides the modified prompt to the generative language model.

Figure 2B:
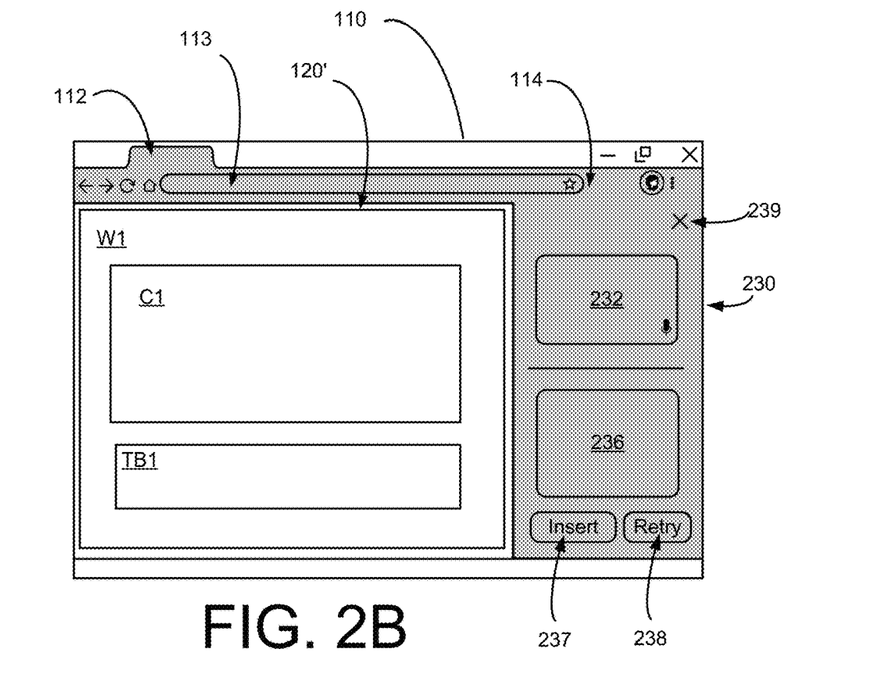
FIGS. 2B and 2C illustrate example drafting assistant interfaces with generated response(s), according to an implementation.

FIG. 2B illustrates example drafting assistant user interface 230 with a generated response, according to an implementation. In the example of FIG. 2B, the browser 110 has received a response generated by the generative language model for the modified prompt and displays the response in the response element 236. In some implementations, the response element 236 is editable. Put another way, in some implementations, the user can edit the generated response displayed in the response element 236. The drafting assistant user interface 230 of FIG. 2B includes an insert control 237 and a retry control 238. The insert control 237 may be a selectable control configured to, in response to selection, copy the response displayed in the response element 236 and paste the response into the text box TB1. Put another way, selection of the insert control 237 may use the response in the response element 236 as the text in text box TB1. Selection of the insert control 237 may also close (remove) the drafting assistant user interface 230. The retry control 238 may be a selectable control configured to, in response to selection by the user, re-submit the modified prompt to the generative language model. In some implementations, the user may be permitted to modify the prompt in the prompt element 232 before selecting the retry control 238. Thus, the modified prompt provided to the generative language model in response to selection of the retry control 238 may be different than the modified prompt that resulted in the response displayed in response element 236 (the prior modified prompt). In some implementations, in response to selection of the retry control 238, the drafting assistant may add an additional instruction as context, e.g., an instruction to rewrite the generated response, to the modified prompt. In some implementations the prior modified prompt and the response generated for that prompt may be provided as additional context for the generative model.

Figure 2C:
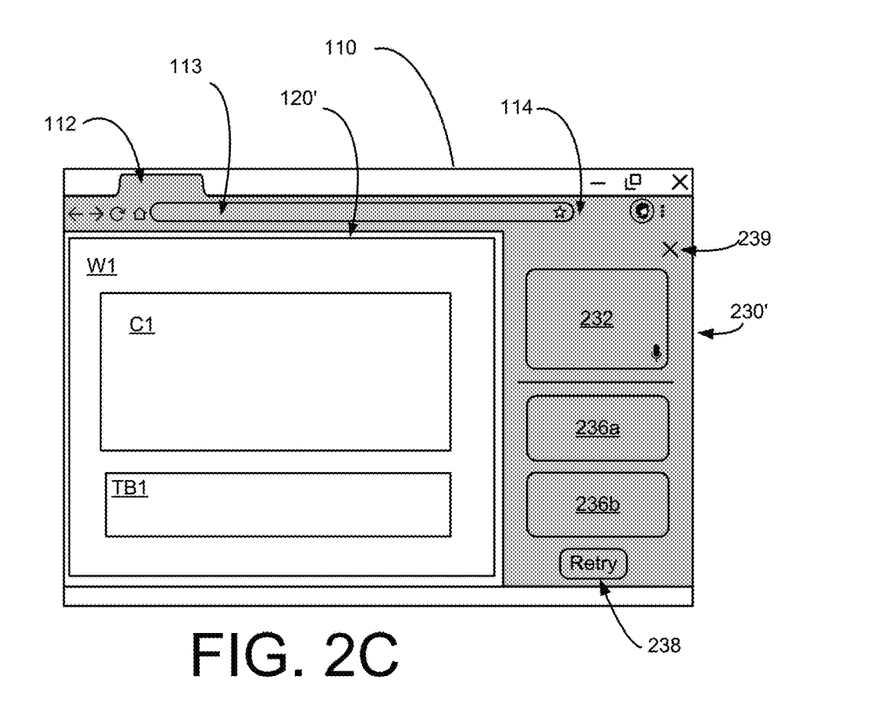

FIG. 2C illustrates example drafting assistant user interface 230' with two generated responses, according to an implementation. In the example of FIG. 2C, the browser 110 has received a first response displayed in response element 236a and a second response displayed in response element 236b. Both responses were generated by the generative language model for the modified prompt. In some implementations, in response to receiving selection of the submit control 234, the browser 110 may submit multiple separate requests (e.g., two separate requests for the example of FIG. 2C) to the generative language model, each request resulting in a respective response. In some implementations, in response to receiving selection of the submit control 234, the browser 110 may submit one request to the generative language model and receive multiple responses (e.g., two responses in the example of FIG. 2C). In some implementations, the drafting assistant may include an instruction to generate the multiple (e.g., two, three, four, etc.) responses, delimiting the responses with a special character that can be used to identify the respective responses. In the example of FIG. 2C, the response element 236a and the response element 236b may be selectable, e.g., each element may be configured like insert control 237, but when selected may insert its respective response into the text box TB1. In some implementations (not shown), the drafting assistant user interface 230' may include two insert controls 237, e.g., one for each response element.

Figure 3A:
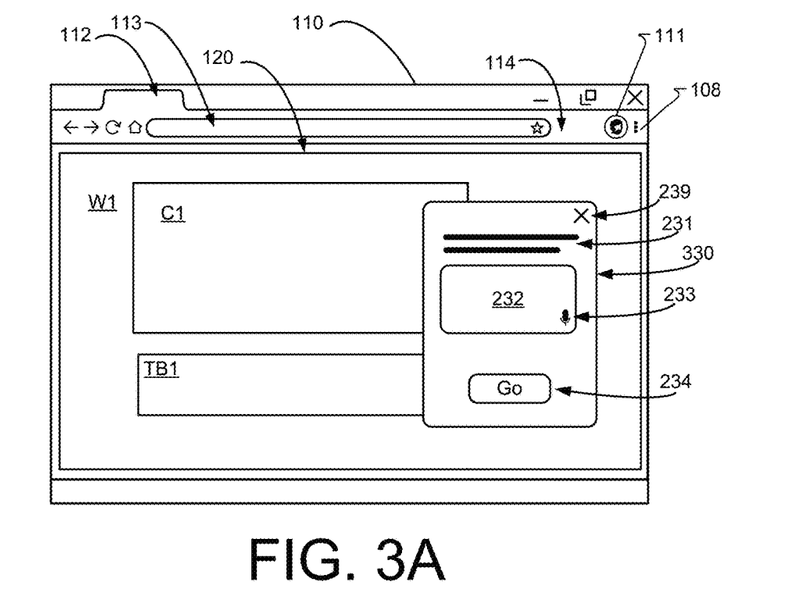
FIG. 3A illustrates an example drafting assistant interface, according to an implementation.

FIG. 3A illustrates an example drafting assistant user interface 330, according to an implementation. In some implementations, the drafting assistant may be configured to display drafting assistant user interface 330 in response to selection of the tool affordance 125. In the example of FIG. 3A, the drafting assistant user interface 330 may be within a floating (pop-up) window. However, in some implementations, the drafting assistant user interface 330 can be in a side panel, an overlay window, or other area of the browser interface. In the example of FIG. 3A, the drafting assistant may be an extension of the browser or may be a service of the browser 110.

In some implementations, the drafting assistant user interface 330 can be triggered in response to selection of a menu option, e.g., from a menu displayed in response to selection of app menu control 108. In some implementations, the drafting assistant user interface 330 can be triggered in response to a text box, such as TB1, receiving focus, as discussed above. In the example of FIG. 3A, the user may have initiated the drafting assistant via selection of the tool affordance 125 in FIG. 1 or via selection of a menu option (not shown) displayed in response to selection of the app menu control 108. As shown in FIG. 3A, in some implementations, the drafting assistant user interface 330 can include one or more elements discussed with respect to drafting assistant user interface 230 of FIG. 2A, e.g., guidance text 231, prompt element 232, voice input control 233, submit control 234, and close control 239. These elements function as described above. FIG. 3A is an example of a drafting assistant user interface 330 where the prompt modifications are not visible to the user. Nevertheless, in some implementations, the drafting assistant user interface 330 may include the prompt modification element 235.

Figure 3B:
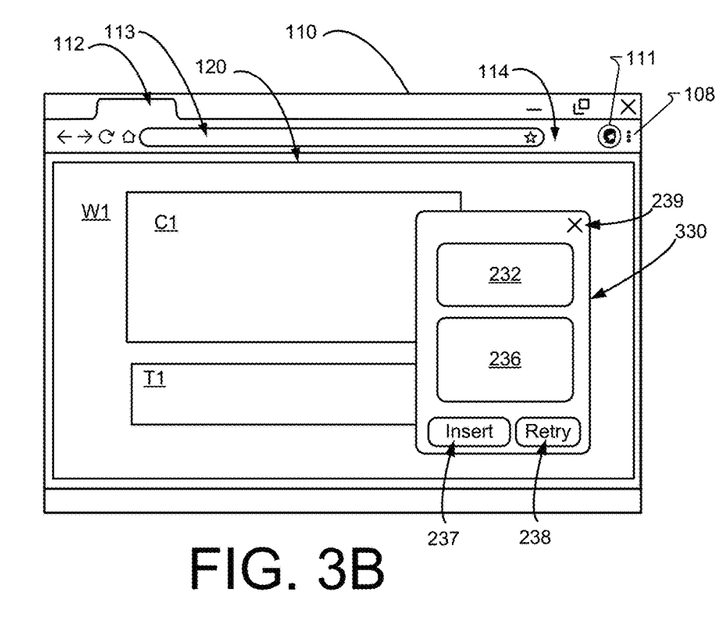
FIGS. 3B and 3C illustrate example drafting assistant interfaces with generated response(s), according to an implementation.

FIG. 3B illustrates example drafting assistant user interface 330 with a generated response, according to an implementation. In the example of FIG. 3B, the drafting assistant has received a response generated by the generative language model for the modified prompt and displays the response in the response element 236. In some implementations, the response element 236 is editable. The drafting assistant user interface 330 of FIG. 3B includes an insert control 237 and a retry control 238, which operate as described above with respect to FIG. 2B.

Figure 3C:
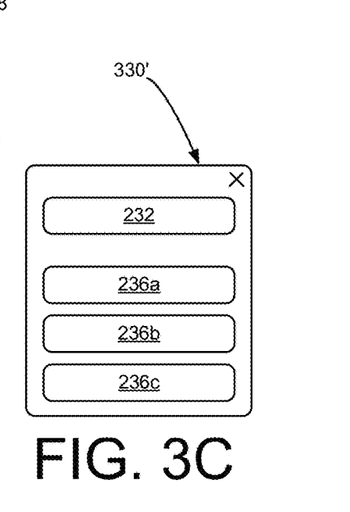

FIG. 3C illustrates example drafting assistant user interface 330' with three generated responses, according to an implementation. In the example of FIG. 3C, the drafting assistant has received a first response displayed in response element 236*a*, a second response displayed in response element 236*b*, and a third response displayed in response element 236*c*. All three responses were generated by the generative language model for the modified prompt (e.g., using three different requests to the generative language model or using one request, which results in generation of the three responses). In some implementations, one or more of the responses may arrive at different times. In such implementations, the user interface 330' may display a response element that indicates a response is expected but not yet received. For example, if a response corresponding with response element 236*a* has been received but a response for response element 236*b* and a response for response element 236*c* has not yet been received, response element 236*b* and response element 236*c* may display a placeholder element. A placeholder element may be text, an icon, or text and an icon. The placeholder element provides an indication that the response is expected but not yet received. The placeholder element may include text indicating the response is loading or a please wait message. The placeholder element may include a "loading" icon. A loading icon can be a short, looping animation, such as a spinning wheel. The text and/or icon may be replaced with the response once it is received. In the example of FIG. 3C, the response element 236*a*, the response element 236*b*, and the response element 236*c* may be selectable, e.g., each element may be configured like insert control 237, but when selected may insert its respective response into the text box TB1. In some implementations (not shown), the drafting assistant user interface 330' may include three insert controls 237, e.g., one for each response element.

Although discussed in the context of a web page W1, in some implementations, the content rendered in the display area 120' may not be a web page. As discussed herein, the content may be associated with any resource accessible via a network or a resource saved on the user's device. Thus, in some implementations, the content displayed in the display area 120' can be in an image, a link, a video, text, a PDF file and/or so forth.

Figure 4A:
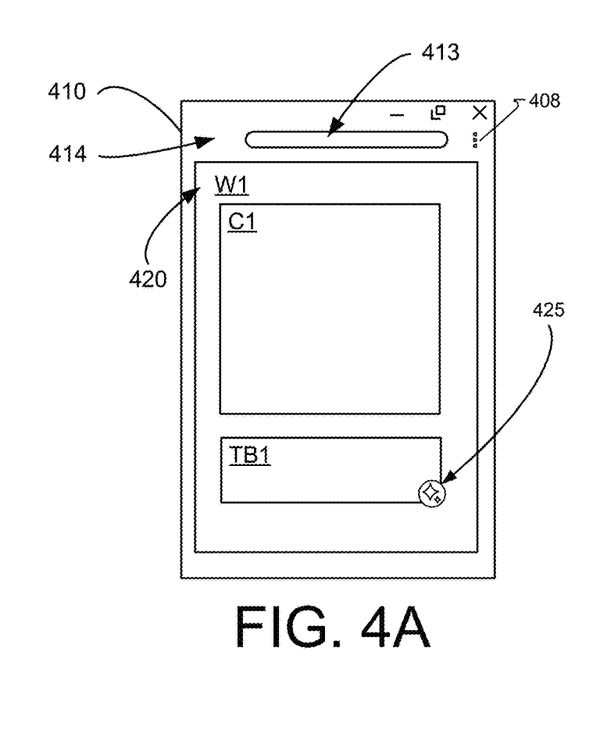
FIG. 4A illustrates an example browser interface illustrating initiation of a drafting assistant tool, according to an implementation.

FIG. 4A illustrates an example browser interface illustrating initiation of a drafting assistant tool on a computing device with limited display area, according to an implementation. The drafting assistant tool can be any of the implementations described above with respect to FIGS. 2A-2C, and/or 3A-3C but because the screen is smaller than the screen illustrated in these prior figures, the drafting assistant tool may include fewer elements or the elements may be represented differently, and/or include fewer different kinds of elements. FIG. 4A is a diagram that illustrates a browser 410 displaying a resource W1 within a display area 420 of the browser 410. In some implementations, the display area 420 can be within a tab of the browser 410. The browser 410 includes an address bar area 414. An address of the web page W1 can be illustrated in the address bar area 414 (e.g., input address area 413). The address bar area 414 can include an app menu control 408. App menu control 408 may be a selectable control that brings up a menu of options, such as settings options or other functionality, provided by the browser 410. Other controls, icons, and/or so forth can be included in the address bar area 414. The address bar area 414 can be controlled by and/or associated with the browser 410 (e.g., the browser application). Because the address bar area 414 is controlled by the browser 410, the web page W1 and/or a provider of the web page W1 does not have access to content displayed in the address bar area 414 or triggering actions provided by actionable elements of the address bar area 414.

The webpage W1 of FIG. 4A includes visible text content C1, e.g., such as text or images, etc. The webpage W1 also includes a multi-line text box TB1, as described in FIG. 1. In the example of FIG. 4A, the user has given the text box TB1 focus. In response to giving the text box TB1 focus, the browser surfaces (causes to be visible, displays) tool affordance 425, which is similar to the tool affordance 125 of FIG. 1. Although illustrated as in/near the multi-line text box TB1, the tool affordance 425 can be located in other areas, such as in the address bar area 414 or in the input address area 413 or at a footer of the browser 410. Additionally, the tool affordance 425 may not be an icon but may be a menu option, as described above.

Figure 4B:
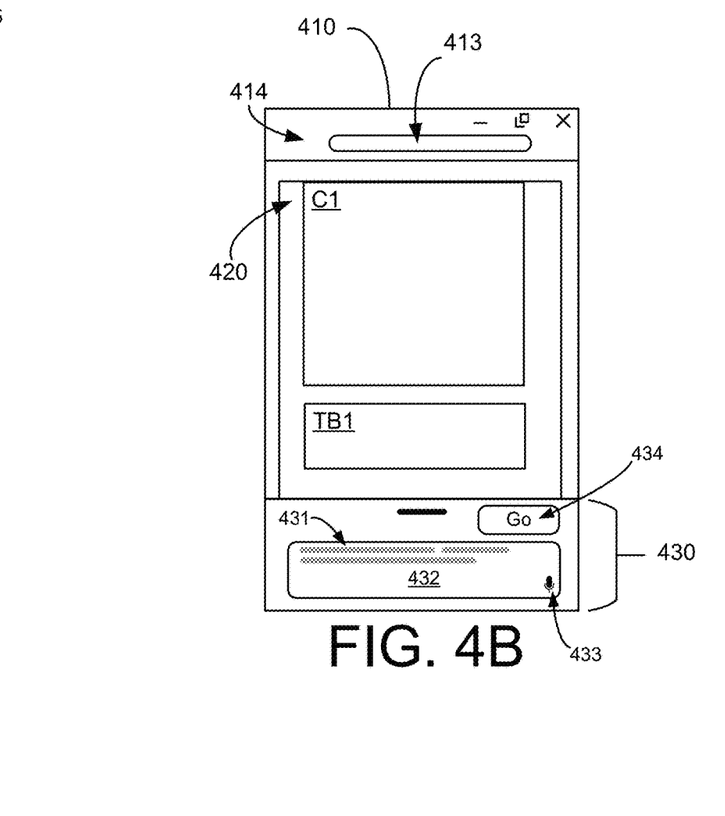
FIGS. 4B and 4C illustrate example drafting assistant interfaces, according to an implementation.

FIG. 4B illustrates an example drafting assistant user interface 430, according to an implementation. In some implementations, the drafting assistant user interface 430 may be an overlay window. The overlay window may partially obscure the display area 420 because of the limited display area. In some implementations, the drafting assistant user interface 430 of FIG. 4B is still an area separate from the display area 420 but within the browser 410. Although the drafting assistant user interface 430 illustrated in FIG. 4B is an overlay window at the bottom of the display area 420, implementations include an overlay window at either side or at the top of the display area 420. In some implementations, the location of the overlay window may be dependent on a device type and/or an orientation of the device. As shown in FIG. 4B, in some implementations, the drafting assistant user interface 430 can include one or more elements discussed with respect to drafting assistant user interface 230 of FIG. 2A, e.g., guidance text 431, prompt element 432, voice input control 433, submit control 434 etc. These elements function as described above. FIG. 4B is an example of a drafting assistant user interface 430 where the prompt modifications are not visible to the user.

Figure 4C:
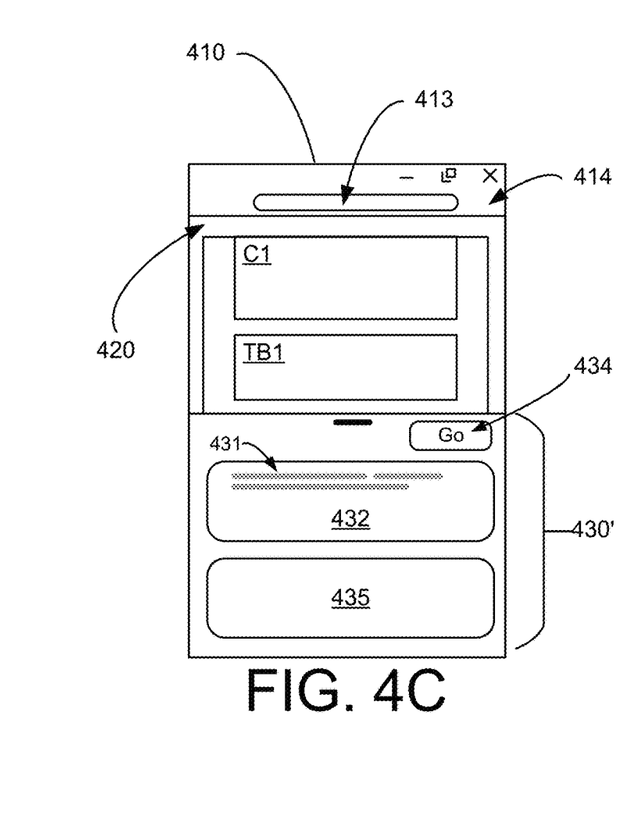

FIG. 4C illustrates an example drafting assistant user interface 430 where the prompt modifications are visible to the user, e.g., prompt modification element 435. As discussed above, in some implementations these modifications may not be editable by the user and in some implementations these modifications may be editable by the user. As illustrated in FIG. 4C, the overlay window of the drafting assistant user interface 430' is expanded further to display the prompt modification element 435. This expansion of the overlay window may cause scrolling of the content of the web page W1 displayed in the display area 420. The scrolling may ensure that the text box TB1 that corresponds to the drafting assistant user interface 430 '(i.e., the text box for which the drafting assistant was opened), is visible in the display area 420. The scrolling may also be done when a response from the generative language model is displayed, e.g., as illustrated in FIG. 4D.

Figure 4D:
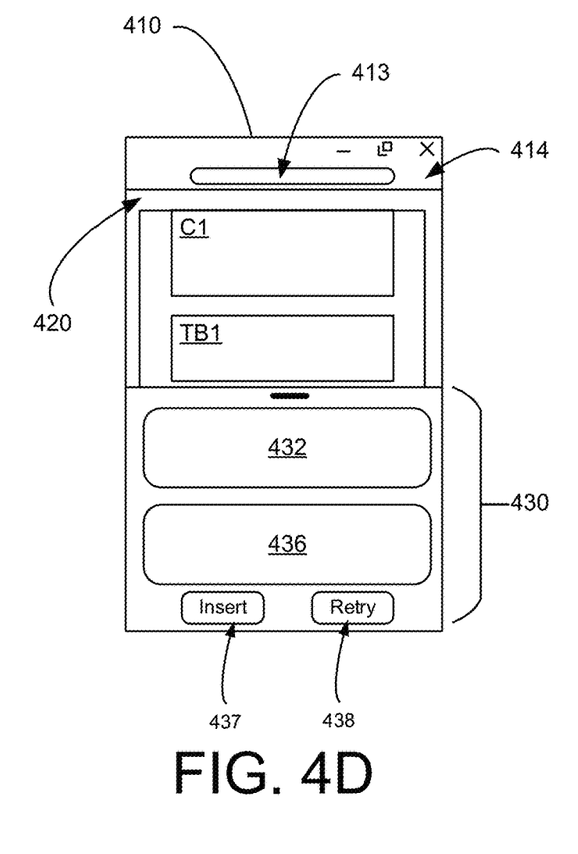
FIG. 4D illustrates an example drafting assistant interface with a generated response, according to an implementation.

FIG. 4D illustrates an example drafting assistant user interface 430 with a generated response, according to an implementation. In the example of FIG. 4D, the drafting assistant has received a response generated by the generative language model for the modified prompt and displays the response in the response element 436. In some implementations, the response element 436 is editable. The drafting assistant user interface 430 of FIG. 4D includes an insert control 437 and a retry control 438, which operate similar to the insert control 237 and retry control 238 as described above with respect to FIG. 2B. Although not illustrated in FIG. 4D, in some implementations, the drafting assistant user interface 430 may include two or more generated responses, as described with respect to FIGS. 2C and 3C.

In some implementations, a (each) generated response may be associated with a confidence level. The confidence level may be associated with the response by the generative language model. In some implementations, if the confidence level for a response fails to meet a confidence threshold the drafting assistant may not display the response. Accordingly, in some implementations, the drafting assistant may determine whether a confidence score associated with a response meets a confidence threshold and, in response to determining that the confidence score does not meet the confidence threshold, the drafting assistant may take a remedial action. The remedial action can be to display a remedial message in place of the generated response in the response element. The remedial message may indicate that a response was not generated, that an error occurred, and/or that the user should try again. In some implementations, the remedial action may include making the instructions generated by the drafting assistant editable if the instructions were not already editable. The remedial action can be to display the response in the response element and to add a remedial message that is displayed with the response. This remedial message may indicate that the response does not have a high confidence and may need edits. In some implementations, the remedial message may include more specific information, such as that the response may not be based on sufficient data, may not have sufficient support from other references, that the response may have poor readability, and/or that the response may include inaccuracies. This specific information may be provided by the generative model.

Figure 5:
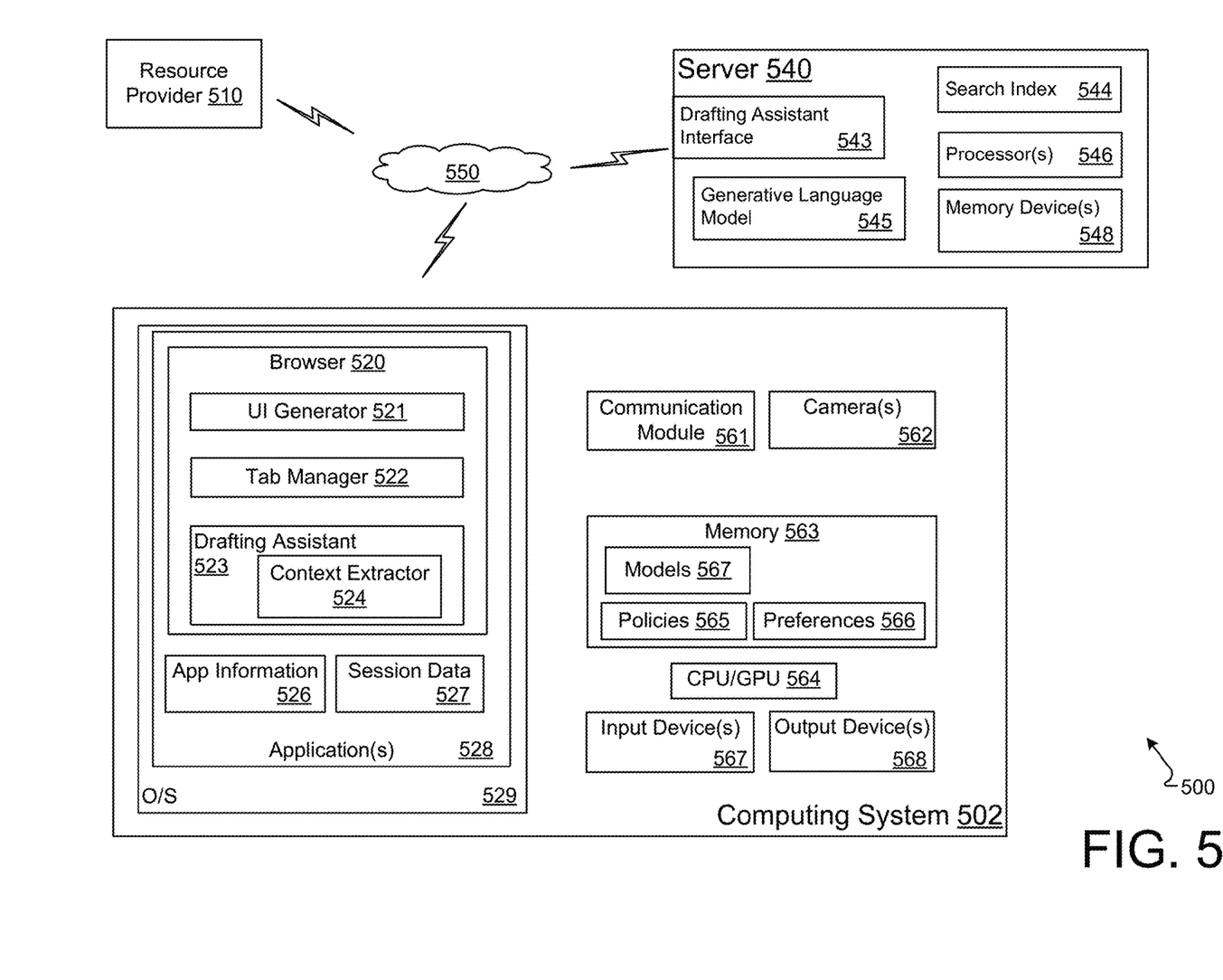
FIG. 5 is a diagram that illustrates a computing system and server for implementing the concepts described herein.

FIG. 5 is a diagram that illustrates a system 500 including a computing system 502 and server 540 for implementing the concepts described and various implementations shown and described herein. The computing system 502 can be a computing device with a limited screen size, such as a smartphone, a smart watch, smart (e.g., A/R or V/R glasses), a tablet, etc. The computing system 502 can be a computing device with a larger screen size, such as a desktop computer, a laptop, a netbook, a notebook, a tablet, a smart TV, a game console, etc., that runs a browser. In general, the computing system 502 can represent any computing device that executes a browser. As shown in FIG. 5, the computing system 502 is configured to communicate with the server 540 and/or a resource provider 510 (e.g., a web server) via a network 550. The computing system 502 includes at least a browser 520 and a drafting assistant 523. In some implementations, the browser 520 is configured to manage resource content, such as web page content, provided by the resource provider 510 (e.g., a web server). In some implementations, the browser 520 is configured to operate as one of several applications 528 executed via an operating system (O/S) 529. The browser 520 can be configured to implement portions of the user interfaces, windows, browser action area, and/or so forth, as described in connection with the implementations described herein.

As shown in FIG. 5, the computing system 502 includes several hardware components including a communication module 561, one or more cameras 562, a memory 563, a central processing unit (CPU) and a graphics processing unit (GPU) 564, one or more input devices 567 (e.g., touch screen, mouse, stylus, microphone, keyboard, etc.), and one or more output devices 568 (screen, speaker, vibrator, light emitter, etc.). The hardware components can be used to facilitate operation of the browser 520, the drafting assistant 523, and/or so forth of the computing system 502.

The browser 520 includes a user interface (UI) generator 521 configured to generate and/or manage the various user interface elements of a browser such as browser 110 as shown and described herein. For example, the UI generator 521 can generate UI elements including the various windows in the browser 110 such as the display area 120, the drafting assistant user interface 230, shown in at least FIGS. 2A through 2C, and the drafting assistant user interface 330, shown in at least FIGS. 3A through 3C, and/or including the various windows in the browser 410 such as display area 420, and the drafting assistant user interface 430, shown at least in FIGS. 4A through 4D.

The browser 520 includes a tab manager 522 configured to generate and/or manage the various tabs (e.g., tab 112) of a browser such as browser 110 or browser 410. The browser 520 may be configured to, amongst other things, provide/perform/assist in performing the actions associated with actionable controls, such as links in the web age, tool affordance 125 or 425, app menu control 108, controls of the drafting assistant user interface 230, such as voice input control 233 or 433, submit control 234 or 434, the insert control 237 or 437, the retry control 238 or 438, the close control 239, prompt element 232 or 432, etc.

The browser 520 includes or is modified to include (e.g., via an extension) a drafting assistant 523. The drafting assistant 523 is configured to generate and/or manage content rendering such as content in the drafting assistant user interface 230, drafting assistant user interface 330, and/or drafting assistant user interface 430 (as shown in at least FIGS. 2A-2C, 3A-3C, and 4B-4D). The drafting assistant 523 can also be configured to determine when to trigger display of the drafting assistant user interface. Put another way, the drafting assistant 523 can be configured to determine what events trigger rendering of the drafting assistant user interface (e.g., 230, 330, 430) and whether the triggering event has occurred. Triggering events can include a text input box receiving focus. Triggering events can exclude text boxes receiving focus when the text box meets certain criteria. For example, if a text box that has an expected format receives focus, the drafting assistant 523 may determine no triggering event has occurred because a generated response is not appropriate for this type of text box. Triggering events can depend on a user history. For example, with user permission, the drafting assistant 523 may learn what features describe text boxes a user has historically used the drafting assistant for and what features describe text boxes a user has historically dismissed the drafting assistant for (e.g., by not clicking the tool affordance 125, or by closing the drafting assistant user interface without generating a response or without using (inserting) a generated response). If a triggering event has occurred, the drafting assistant 523 may trigger the tool affordance (tool affordance 125 or 425).

In some implementations, the drafting assistant 523 can include context extractor 524. In some implementations, portions of the context extractor 524 may be part of the browser process. The context extractor 524 may be configured to identify context related to an input for a text box of a web page displayed by the browser 520. In other words, the context extractor 524 may be configured to identify which content associated with a resource displayed in the display area of a browser is relevant to the text box for which the drafting assistant 523 was launched. As described herein, the context extractor 524 may take as input a DOM tree and/or an accessibility tree generated by the browser 520 for the resource and determine context related to the text box. A benefit of using both a DOM tree and an accessibility tree is additional descriptive nodes in the accessibility tree for DOM elements such as images. In some implementations, a domain of the resource (e.g., from the URL of the web page) may be considered context related to the input text box. In some implementations, a title of the web page may be considered context related to the input text box. Attributes of the text box, such as a maximum size for the text box, may be considered context related to the input text box. The attributes may be identified in the DOM tree and/or the accessibility tree. A purpose or type of the text box may be context related to the input text box. The purpose or type may be determined based on a number of factors, such as text used to describe the text box (e.g., a name/label of the text box, text appearing with the text box, the domain of the web page, etc.). A type of (vertical for) the web page and/or a main entity of the web page may be context related to the text box. For example, the context extractor 524 may be configured to determine whether the web page falls under a particular vertical, such as shopping, entertainment, restaurants, etc., which are typically associated with an entity (e.g., an item being offered for sale, a particular restaurant, a particular entertainment venue, etc.) The context extractor 524 may be configured to identify a main entity, which can be considered relevant to the text box. In some implementations, the context extractor 524 may use the length of other similar elements, e.g., other reviews, other posts, other comments, etc., as context for the text box.

The context extractor 524 may be configured to ignore or exclude certain elements from the context. These elements can include user information, or in other words elements provided by a user (e.g., associated with input controls), elements describing a user (e.g., usernames, profile information, account numbers, etc.), etc. These elements can include sensitive information. Sensitive information may include age-restricted content (e.g., adult content, whether text or images). Sensitive information may include account information (e.g., a page from a financial institution). Sensitive information may include any personal information. Thus, even if the web page content includes such information, it may not be considered context. In some implementations, when a resource is determined to be a sensitive resource, not all features of the drafting assistant tool may be enabled. For example, the drafting assistant tool may be disabled for some sensitive resources. In such implementations, the tool affordance 125 or tool affordance 425 may not be surfaced for a text box and/or the submit control 234 or control 434 may be inactive/disabled if the resource is determined to be a sensitive resource. In some implementations, where the browser 520 includes a safe browsing service and the safe browsing service has determined that the web page is harmful, the web page may be considered a sensitive web page and the drafting assistant disabled. In such implementations, the browser 520 may calculate a trustworthiness score for the web page as part of the safe browsing service. In some implementations, the context extractor 524 may be a machine-learned model that executes on the computing system 502. The model may be trained to detect the sensitivity of the resource and/or to calculate a trustworthiness score for the web page. The model may be trained to determine what to extract based on the sensitivity. The model may be trained to exclude (e.g., ignore) certain types of information, such as user information, sensitive information. A trustworthiness score generated for a web site can be considered a trustworthiness score for the web page where the web page does not itself receive a trustworthiness score.

The browser 520 can be configured to generate and/or manage content rendering associated with a resource (e.g., web page W1) in the display area 120 and/or 420 (including display area 120'), shown in the figures. The resource content can be provided to the computing system 502 by the resource provider 510. The browser 520 and/or the drafting assistant 523 can be configured to implement the processes, or portions of the processes, described in connection with FIG. 6. As shown in FIG. 5, session data 527 (which can be stored in memory 563 (not shown)) can be managed as, or by, one of the applications 528. The session data 527 can include data related to one or more browser sessions, with user permission. In some implementations, the session data 527 can include historical user data to help the drafting assistant 523 determine when a triggering event has occurred. The application information 526 can include information related to the various applications operating within and/or that can be executed by the O/S 529.

As shown in FIG. 5, the communication module 561 can be configured to facilitate communication with the resource provider 510 and/or server 540 via the network 550 via one or more communication protocols. The camera 562 can be used for capturing one or more images, the memory 563 can be used for storing information associated with the browser 520 and/or drafting assistant 523, other applications 528, O/S 529, etc. The CPU/GPU 564 can be used for processing information and/or images associated with the browser 520 and/or drafting assistant 523. The computing system 502 also includes one or more output devices 568 such as communication ports, speakers, displays, and/or so forth. The functionality described in this application can be implemented based on one or more policies 565 and/or preferences 566 stored in the memory 563.

FIG. 5 illustrates some aspects of the server 540. For example, the server 540 includes one or more processors 546 and one or more memory devices 548. In some implementations, the server 540 may include or have access to a search index 544. Although illustrated as part of the server 540, the search index 544 may be communicatively connected to the server 540. The search index 544 may be an index of web pages, an index of images, an index of products, an index for an entity repository, a news index, etc.

In implementations where the drafting assistant 523 is associated with a search engine, the server 540 may include drafting assistant 543. In implementations with a drafting assistant 543, the drafting assistant 543 may be an application program interface configured to receive the request from the drafting assistant 523 that includes the modified prompt and to further modify the modified prompt, e.g., by adding additional instructions to the prompt before it is routed to the generative language model 545. To identify the additional instructions, the drafting assistant 543 may be configured to use the search index 544 to identify resources related to terms and conditions associated with the domain of the web page for which the drafting assistant was launched, i.e., the web page displayed by the browser 520. The terms and conditions resources may include additional context related to the text box and can be used by the drafting assistant 543 to further modify the prompt. For example, the terms and conditions for the domain may include limitations on content submitted via the text box, such as prohibitions on vulgarities, inflammatory or racist language, etc. These additional limitations may be identified by the drafting assistant 543 and additional instructions added to the modified prompt, e.g., in the form of "do not use profanity or inflammatory or racist language in the response." In some implementations, the drafting assistant 543 may add an instruction to generate more than one (e.g., two, three, etc.) different responses to the modified prompt, the responses being separated from each other by a special character. In some implementations, this instruction to generate more than one response may be added by the drafting assistant 523.

In some implementations, with user permission, the drafting assistant 543 may be configured to determine contextual suggestions based on preference information. For example, the preference may be from a profile of a user may include user preferences considered when making contextual suggestions. In some implementations, the preference may be inferred from browsing history, with user permission.

The server 540 may include generative language model 545. The generative language model 545 may be a large language model based on a transformer network configured to generate responses to prompts. Examples of such generative language models include, but are not limited to, GLaM, LaMDA, PaLM, GPT-3, BARD, ChatGPT, etc. The generative language model 545 may be any language model configured to respond to any prompt, i.e., the generative language model 545 is a generalist model, but may include some tuning to ensure factuality. In other words, the generative language model 545 does not need specialized training to respond to the modified prompts and implementations can integrate with existing generative language models. In some implementations, the generative language model 545 may be configured to receive a request from, and provide a response to, the drafting assistant 523. In some implementations, the request from the drafting assistant 523 may be routed through a drafting assistant 543. In such implementations, the drafting assistant 543 may route the request (the modified prompt) from the drafting assistant 523 to the generative language model 545 and route the response generated by the generative language model 545 to the modified prompt to the browser 520 and/or the drafting assistant 523. Although not illustrated in FIG. 5, in some implementations the generative language model 545 may be local to the computing system 502 and communication with a server 540 or a network connection may not be needed to provide the modified prompt to the model or to receive the responses.

Figure 6:
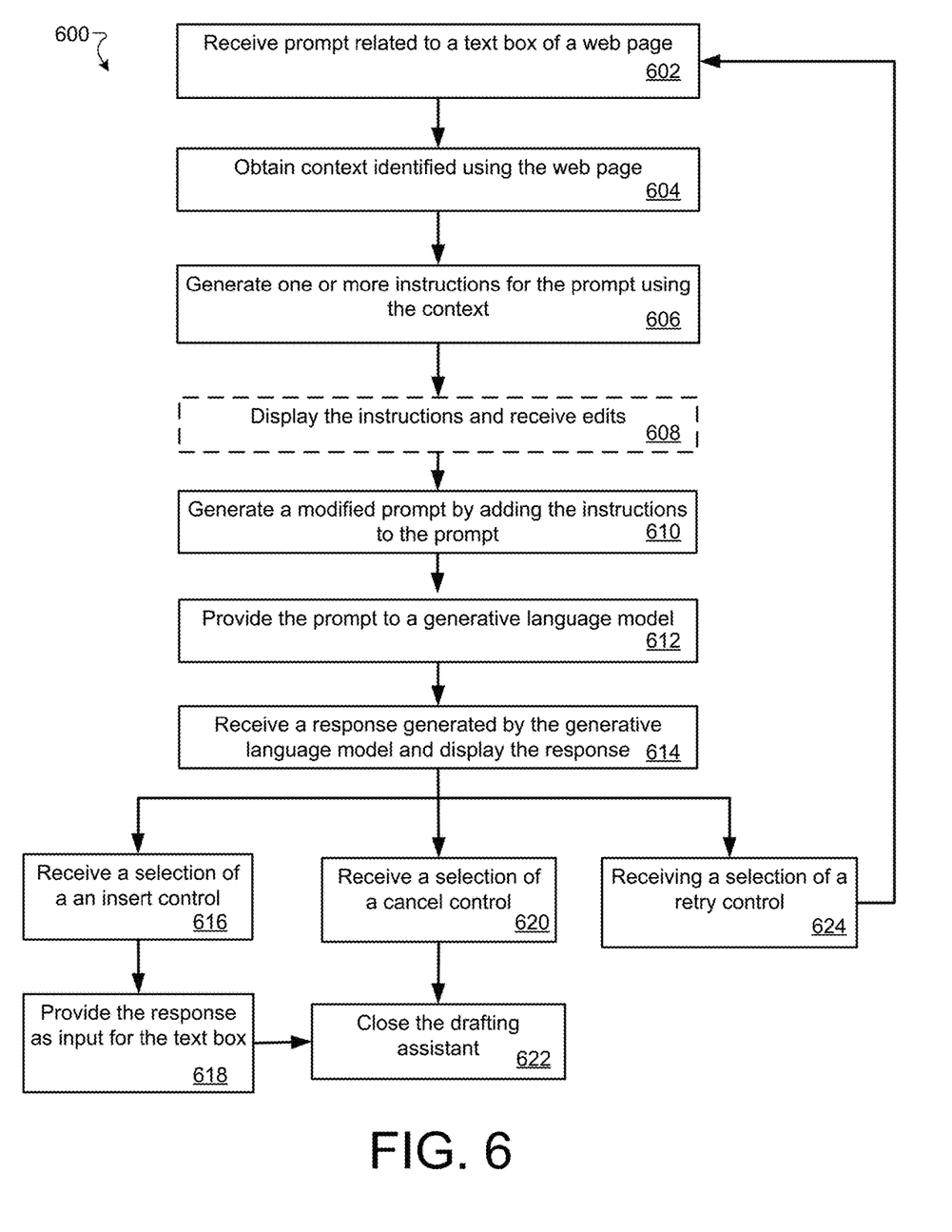
FIG. 6 is a flowchart illustrating an example process for providing a drafting assistant tool, according to an implementation.

FIG. 6 is a flowchart that illustrates an example method 600 of performing at least some of the concepts described herein in the various figures. Many elements of the method 600 can be implemented by the system shown in at least FIG. 5. In particular, the method 600 can be performed by a browser, (e.g., browser 520) of a computing system 502. The example method 600 is an example of a drafting assistant that adds context to a user's prompt for a generative language model so that the model generates a higher quality and more appropriate response for the text box. The drafting assistant can be triggered (invoked) by the user, e.g., via interactions with an icon, a menu option, etc.

At step 602, the system may receive a prompt related to a text box of a web page. The prompt may be obtained via a user interface provided in response to invoking the drafting assistant. At step 604, the system may obtain context identified using the web page. Step 604 may be performed concurrently with step 602. For example, while the system is waiting for the prompt to be entered the system may be obtaining the context. The context can be identified from a DOM tree. The context may be identified from an accessibility tree. The context may be identified from a DOM tree and an accessibility tree. The context can be one or more attributes of the text box. The context can be a restriction related to the text box. The context can be a character length for the text box. The context can be a type of the text box. A context can be a source (domain) for the web page. The context can be a trustworthiness score for the web page and/or for the web site (domain). The trustworthiness score can be calculated or obtained by the browser. The trustworthiness score can be calculated by the drafting assistant. The context can include text for or near the text box. The context can include text the user has already provided in the text box.

At step 606 the system may generate one or more instructions for the prompt using the context. The instructions can be configured as instructions for a generative language model. For example, where the context is a trustworthiness score that fails to satisfy a trustworthiness threshold, the instructions may include an instruction to "generate a response in the style of a person responding to a phishing site" or "do not include any personal information in your response." As another example, where text associated with the text box includes a character limit, the instructions may be "please limit your response to x characters," where x is extracted from the context. As another example, an instruction may be "phrase your response as a comment" where the text box is determined to be a comment text box, or "phrase your response in the style of newsite.com" where the text box appears on a webpage for newsite.com.

At step 608, the system may optionally display the instructions to the user. In some implementations, the instructions are not displayed to the user. In some implementations, the displayed instructions may be editable by the user, i.e., displayed in an editable user interface element. In some implementations, the displayed instructions are not editable by the user. In some implementations, whether or not to display the instructions can be based on a trustworthiness score for the web page. In some implementations, whether or not to make the instructions editable may depend on a classification of the web site associated with the web and/or the text box associated with the web page. In some implementations, whether or not to make the instructions editable may depend on a confidence score associated with the instructions. For example, the instructions may be associated with a confidence score that fails to meet a confidence threshold, and the system may make such instructions editable by the user. The confidence score can be associated with the instructions by a model used to generate the instructions or otherwise as part of generating the instructions.

At step 610, the system may generate a modified prompt by adding the instructions to the prompt (provided by the user). The system may generate the modified prompt by appending the instructions to the prompt. In some implementations, additional instructions may also be obtained from a search index, e.g., from terms and conditions resources (PDF, document, or web pages) associated with the web page. At step 612, the system may provide the prompt to a generative language model. The generative language model may be on the client device. The generative language model may be accessible to the browser, e.g., at a server. The generative language model generates a response to the modified prompt. The instructions added to the user's prompt help the generative language model generate a higher quality response appropriate for the text box.

At step 614, the system may receive a response from the generative language model and display the response to the user in a user interface generated by the drafting assistant. The user interface may include controls for reacting to the response. The controls can include an insert control. If the user selects the insert control, at step 616 the system may receive the selection of the insert control and, at step 618 in response to the selection of the insert control, the system may insert the response into the text box on the web page. In other words, the system pastes the generated response into the text box in response to selection of the insert control. At step 622, the system may also remove the drafting assistant user interface after, or concurrently with, pasting the response into the text box. This selection of the insert control may be recorded, with user permission, in a user history to help determine when and/or whether to surface the tool affordance for the drafting assistant for this user.

The controls can include a cancel control. At step 620, the system may receive selection of the cancel control and, in response to receiving the selection of the cancel control, at step 622, the system may remove the drafting assistant user interface without pasting the response into the text box. This selection of the cancel control may be recorded, with user permission, in a user history to help determine when and/or whether to surface the tool affordance for the drafting assistant for this user.

The controls can include a retry control. At step 624, the system may receive selection of the retry control. In response to the selection of the retry control the system may restart all or part of method 600. For example, in some implementations, selection of the retry control may cause the prompt received from the user to be deleted. In some implementations, selection of the retry control may cause the system to generate another response (i.e., to regenerate the response) based on the same modified prompt. In some implementations, selection of retry control may generate a new prompt that tells the generative language model to "draft a different response" using the prior modified prompt and prior generated response may as context for the new prompt. Other similar retry responses fall within disclosed implementations. In some implementations, the retry control may be disabled or may not be displayed depending on bandwidth. For example, if providing the prompt to the generative language model involves a network connection, the bandwidth/quality of the network connection may be poor and the system may not allow a retry, e.g., by disabling or not displaying the retry control. Similarly, the length of time between providing the request to the model and receipt of the response may be used to determine whether to disable the reply control.

Further to the descriptions above, a user may be provided with controls allowing the user to make an election as to both if and when features described herein may enable collection of user information, such as information about a user's use of, or dismissal of, the drafting assistant, when or whether the drafting assistant is active, and if the prompt can be sent to a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

A number of implementations have been described. Nevertheless, it will be understood that various modifications may be made without departing from the spirit and scope of the disclosed implementations.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

Clause 1. A method comprising: receiving a prompt from a user related to an input for a text box of a web page; generating a modified prompt by adding instructions to the prompt based on context identified using the web page; providing the modified prompt to a generative language model; receiving a response generated by the generative language model for the modified prompt; and providing the response as the input for the text box.

Clause 2. The method of clause 1, wherein the context of the web page includes a restriction related to the text box and the instructions include an instruction to the generative language model to limit the response based on the restriction.

Clause 3. The method of clause 2, wherein the restriction is a character length for the text box.

Clause 4. The method of clause 2, wherein the restriction is obtained from text describing the text box.

Clause 5. The method of any one of clauses 1 to 4, wherein the context of the web page includes a type for the text box and the instructions include an instruction to phrase the response based on the type.

Clause 6. The method of any one of clauses 1 to 5, wherein the context of the web page includes a source of the web page and the instructions include an instruction to phrase the response in a style of the source.

Clause 7. The method of any one of clauses 1 to 6, wherein the method further comprises: detecting focus on the text box; and providing a selectable icon in response to detecting the focus, the selectable icon configured to present a user interface with an element for obtaining the prompt, wherein the prompt is obtained from the user interface.

Clause 8. The method of clause 7, wherein the method further comprises: presenting the response in the user interface, the user interface further including: a control for regenerating the response, and a control for using the response; and in response to selection of the control for using the response, providing the response as the input for the text box.

Clause 9. The method of clause 8, wherein the method further comprises, in response to selection of the control for regenerating the response: providing the modified prompt to the generative language model; receiving a second response generated by the generative language model; and presenting the second response in the user interface that includes the control for regenerating the response and the control for using the response.

Clause 10. The method of any one of clauses 1 to 9, wherein the method further comprises providing the instructions in an editable user interface element prior to providing the modified prompt to the generative language model.

Clause 11. The method of any one of clauses 1 to 9, wherein the prompt is displayed in a first user interface element and the instructions are displayed in a second user interface element.

Clause 12. The method of any one of clauses 1 to 11, wherein the instructions include an instruction to generate at least a first response and a second response to the modified prompt, the response is the first response, and the method further comprises: presenting the first response and the second response for selection; and receiving a selection of the first response, wherein the first response is provided as the input for the text box in response to receiving the selection.

Clause 13. The method of any one of clauses 1 to 12, further comprising: determining a trustworthiness score for the web page; determining that the trustworthiness score satisfies an untrustworthiness threshold; and in response to determining the trustworthiness score satisfies the untrustworthiness threshold, the instructions include an instruction to exclude personal information.

Clause 14. The method of any one of clauses 1 to 13, further comprising: determining a trustworthiness score for the web page; determining that the trustworthiness score satisfies an untrustworthiness threshold; and in response to determining the trustworthiness score satisfies the untrustworthiness threshold, the instructions include an instruction to generate the response in a style of a person answering an untrustworthy site.

Clause 15. The method of any one of clauses 1 to 14, further comprising: determining a trustworthiness score for the web page; and determining that the trustworthiness score satisfies a trustworthiness threshold; wherein generating the modified prompt occurs in response to determining the trustworthiness score satisfies the trustworthiness threshold.

Clause 16. A method comprising: determining that a text box on a web page receives focus; in response to determining that the text box receives focus, surfacing an affordance configured to initiate a drafting assistant tool in response to selection of the affordance; receiving selection of the affordance; and in response to receiving selection of the affordance: generating a prompt for a generative language model by adding instructions based on context for the text box identified using the web page to user-provided instructions, providing the prompt to a generative language model, receiving a response generated by the generative language model for the prompt, and providing the response as input for the text box.

Clause 17. The method of clause 16, wherein the user-provided instructions include content in the text box prior to receiving selection of the affordance.

Clause 18. The method of clause 16 or 17, further comprising, in response to receiving selection of the affordance: initiating display of a drafting assistant user interface that includes a prompt element, guidance text, and a submit control, wherein providing the prompt to the generative language model occurs responsive to receiving selection of the submit control, wherein in response to receiving the response, the method includes displaying the response and an insert control in the drafting assistant user interface, and wherein providing the response as the input for the text box occurs responsive to receiving a selection of the insert control.

Clause 19. The method of clause 18, wherein the insert control displays the response.

Clause 20. A computer-readable medium storing instructions that, when executed by at least one processor, cause the at least one processor to perform the method of any one of clauses 1 to 18.

Clause 21. A system comprising: at least one processor; and a memory storing instructions that, when executed by the at least one processor, cause the system to perform any of the methods or operations disclosed herein.

What is claimed is:

1. A computer-readable medium storing instructions that, when executed by at least one processor, cause the at least one processor to execute operations comprising:

detecting focus on a text box of a web page;
providing a selectable icon in response to detecting the focus, the selectable icon configured to present a user interface with an element for obtaining a prompt related to an input for the text box;
receiving the prompt from the user interface;
providing the prompt to a generative language model;
receiving a response generated by the generative language model for the prompt; and
providing the response as the input for the text box.

2. The computer-readable medium of claim 1, further comprising generating a modified prompt by adding instructions to the prompt based on context identified using the web page, wherein the context of the web page includes a restriction related to the text box and the instructions include an instruction to the generative language model to limit the response based on the restriction.

3. The computer-readable medium of claim 2, wherein the restriction is a character length for the text box.

4. The computer-readable medium of claim 2, wherein the restriction is obtained from text describing the text box.

5. The computer-readable medium of claim 1, further comprising generating a modified prompt by adding instructions to the prompt based on context identified using the web page, wherein the context of the web page includes a type for the text box and the instructions include an instruction to phrase the response based on the type.

6. The computer-readable medium of claim 1, further comprising generating a modified prompt by adding instructions to the prompt based on context identified using the web page, wherein the context of the web page includes a source of the web page and the instructions include an instruction to phrase the response in a style of the source.

7. The computer-readable medium of claim 1, wherein the operations further comprise:
determining that the text box does not enforce a format,
wherein the selectable icon is provided in response to detecting the focus and to determining that the text box does not enforce a format.

8. The computer-readable medium of claim 1, wherein the operations further comprise:
presenting the response in the user interface, the user interface further including:
a control for regenerating the response, and
a control for using the response; and
in response to selection of the control for using the response, providing the response as the input for the text box.

9. The computer-readable medium of claim 8, wherein the operations further comprise, in response to selection of the control for regenerating the response:
providing the prompt to the generative language model;
receiving a second response generated by the generative language model; and
presenting the second response in the user interface that includes the control for regenerating the response and the control for using the response.

10. The computer-readable medium of claim 1, wherein the operations further comprise providing the instructions in an editable user interface element prior to providing the prompt to the generative language model.

11. The computer-readable medium of claim 1, wherein the prompt is displayed in a first user interface element and the instructions are displayed in a second user interface element.

12. The computer-readable medium of claim 1, wherein the instructions include an instruction to generate at least a first response and a second response to the prompt, the response is the first response, and the operations further comprise:
presenting the first response and the second response for selection; and
receiving a selection of the first response,
wherein the first response is provided as the input for the text box in response to receiving the selection.

13. The computer-readable medium of claim 1, wherein the operations further comprise:
determining a trustworthiness score for the web page;
determining that the trustworthiness score satisfies an untrustworthiness threshold; and
in response to determining the trustworthiness score satisfies the untrustworthiness threshold, the instructions include an instruction to exclude personal information.

14. The computer-readable medium of claim 1, wherein the operations further comprise:
determining a trustworthiness score for the web page;
determining that the trustworthiness score satisfies an untrustworthiness threshold; and
in response to determining the trustworthiness score satisfies the untrustworthiness threshold, the instructions include an instruction to generate the response in a style of a person answering an untrustworthy site.

15. The computer-readable medium of claim 1, wherein the operations further comprise:
determining a trustworthiness score for the web page;
determining that the trustworthiness score satisfies a trustworthiness threshold; and
generating a modified prompt by adding instructions to the prompt based on context identified using the web page in response to determining the trustworthiness score satisfies the trustworthiness threshold.

16. A system comprising:
at least one processor; and
a memory storing instructions that, when executed by the at least one processor, cause the system to perform operations including:
detecting focus on a text box of a web page;
providing a selectable icon in response to detecting the focus, the selectable icon configured to present a user interface with an element for obtaining a prompt related to an input for the text box;
receiving the prompt from the user interface,
providing the prompt to a generative language model,
receiving a response generated by the generative language model for the prompt, and
providing the response as the input for the text box.

17. The system of claim 16, wherein the operations further comprise generating a modified prompt by adding instructions to the prompt based on context identified using the web page, and wherein the context of the web page includes a restriction related to the text box and the instructions includes an instruction to the generative language model to limit the response based on the restriction.

18. The system of claim 16, wherein the operations further comprise generating a modified prompt by adding instructions to the prompt based on context identified using the web page, and wherein the context of the web page includes a type for the text box and the instructions include an instruction to phrase the response based on the type.

19. The system of claim 16, wherein the operations further comprise:
determining that the text box does not enforce a format, wherein the selectable icon is provided in response to detecting the focus and to determining that the text box does not enforce a format.

20. The system of claim 16, wherein the operations further comprise:
   presenting the response in the user interface, the user interface further including:
   a control for regenerating the response, and
   a control for using the response; and
   in response to selection of the control for using the response, providing the response as the input for the text box.

21. The system of claim 16, wherein the operations further comprise;
   generating a modified prompt by adding instructions to the prompt based on context identified using the web page, and
   providing the instructions in an editable user interface element prior to providing the modified prompt to the generative language model.

22. A method comprising:
   determining that a text box on a web page receives focus;
   in response to determining that the text box receives focus, surfacing an affordance configured to initiate a drafting assistant tool in response to selection of the affordance;
   receiving selection of the affordance; and
   in response to receiving selection of the affordance:
      generating a prompt for a generative language model by adding instructions based on context for the text box identified using the web page to user-provided instructions,
      providing the prompt to the generative language model,
      receiving a response generated by the generative language model for the prompt, and
      providing the response as input for the text box.

23. The method of claim 22, wherein the user-provided instructions include content in the text box prior to receiving selection of the affordance.

24. The method of claim 22, further comprising, in response to receiving selection of the affordance:
   initiating display of a drafting assistant user interface that includes a prompt element, guidance text, and a submit control,
   wherein providing the prompt to the generative language model occurs responsive to receiving selection of the submit control,
   wherein in response to receiving the response, the method includes displaying the response and an insert control in the drafting assistant user interface, and
   wherein providing the response as the input for the text box occurs responsive to receiving a selection of the insert control.

25. The method of claim 24, wherein the insert control displays the response.

* * * * *

UNITED STATES PATENT AND TRADEMARK OFFICE
CERTIFICATE OF CORRECTION

| | | |
|---|---|---|
| PATENT NO. | : 12,430,498 B2 | Page 1 of 1 |
| APPLICATION NO. | : 18/480969 | |
| DATED | : September 30, 2025 | |
| INVENTOR(S) | : Azose et al. | |

It is certified that error appears in the above-identified patent and that said Letters Patent is hereby corrected as shown below:

In the Claims

In Column 23, Claim 21, Line 14, delete "comprise;" and insert --comprise:--, therefor.

Signed and Sealed this
Eleventh Day of November, 2025

John A. Squires
*Director of the United States Patent and Trademark Office*